Oct. 27, 1953 M. D. BERGAN 2,657,251
CABLE CONNECTOR
Filed Jan. 21, 1950

INVENTOR.
MARTIN D. BERGAN
BY James C. Ledbetter
ATTORNEY.

Patented Oct. 27, 1953

2,657,251

UNITED STATES PATENT OFFICE 2,657,251

CABLE CONNECTOR

Martin D. Bergan, Westfield, N. J., assignor to The Thomas & Betts Co., Elizabeth, N. J., a corporation of New Jersey Application January 21, 1950, Serial No. 139,929

3 Claims. (Cl. 174—65.)

This invention relates to a cable connector of new and useful form for assembling raceway systems enclosing and protecting insulated electrical conductors comprising the wiring of light and power circuits.

Fittings of this type function as mechanical-joint-forming devices, constitute an integrated part of the protective conduited raceway system, are insulated from the wiring per se enclosed within the conduits, and are non-conductive except when the insulation fails and a short circuit mishap or other fault in the wiring may charge the raceway with a flow of current to the ground. Consequently, such fittings are not in the same classification with electrical connectors and involve distinct problems in their improvement and manufacture.

Cable connectors of the type improved herein are used for joining raceway parts—especially flexible-metallic conduit and BX cable kindred thereto—with raceway boxes in general. These two types of conduit comprise a flexible-metallic spiral-armor sheath which encloses and protects the insulated conductors constituting the electrical circuit wiring within the armored raceway which is grounded.

In electrical wiring employing spiral-armor conduiting, it is or should be required that the installation be visible for inspection where the insulated wires emerge from the conduit, extend through the front end of the cable connector, and enter the box, that is, at the juncture-assembly of the latter members where a short circuit is more likely to occur. It is a critical point in raceway joints, and the preservation of the insulation on the electrical wiring is essential.

It is the purpose of this invention to provide improvements at the front end of a cable connector, by eliminating the well known peep-hole inspection apertures, and to provide instead a transparent bushing which more fully and satisfactorily performs the several functions, to-wit, that of a limit-stop for the end of the spiral-armor; also a smooth surfaced open-throat passage, formed of insulation, through which the wiring extends into the conduit box; and likewise good visibility of the well-known anti-short fiber liner (usually colored red) which the workman should fit into the cut-off end of the spiral-armor and around the wires emerging therefrom into the cable connector when he is making the installation.

The foregoing only briefly points out some of the problems in which spiral-armor raceway cable connectors are involved, but the other problems thereof will be understood by those conversant with the art—in particular those factors concerning the bushing-throats of cable connectors, the manufacture, installation, and utility thereof, also their ability to maintain an enduring juncture-assembly which is permanently insulated from the electrical wiring against short circuiting hazards in its many unpredictable forms.

The accompanying drawings with description and claims explain the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

Figure 3:
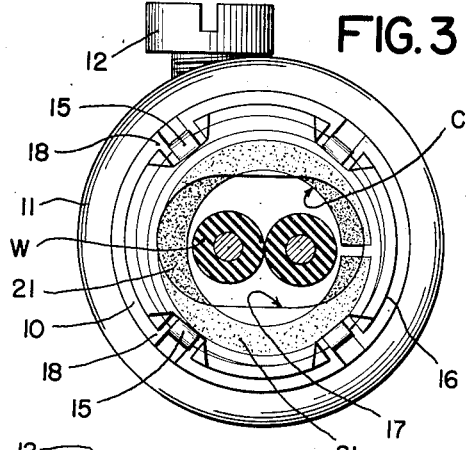

Fig. 3 also shows a front end elevation of the connector but with a spiral-armor sheathed two-wire conductor inserted therein. An anti-short liner is in place, as required when spiral-armor is used. In actual practice, the liner is clearly observed through the transparent front end of the connector (its bushing), but in the official drawings the liner is more readily observed in Fig. 6. This well known anti-short liner is stippled for color (usually made of red fiber) in Figs. 3 and 6.

Figure 1:
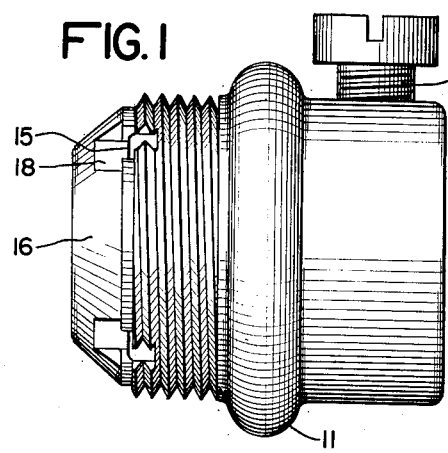
Fig. 1 is a side elevation showing a conventional type of cable connector, with my new and improved transparent plastic bushing carried at the front end thereof. The front end of the connector is at the lefthand side of the view, and the rear end is at the right.
Figure 2:
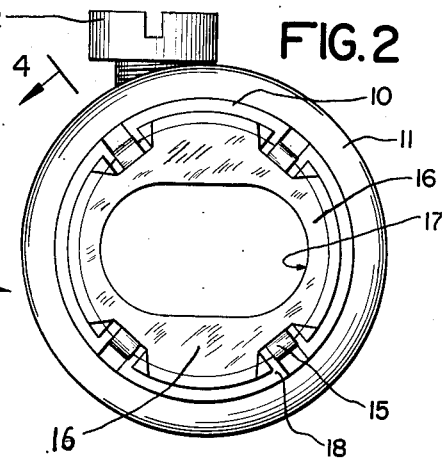
Fig. 2 is a front end elevation of the connector showing its transparent bushing, thus as viewed from the left in Fig. 1.
Figure 4:
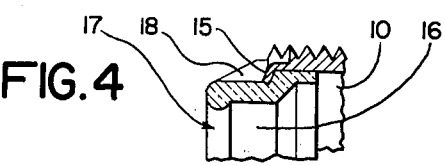

Fig. 4 shows a fragmentary detail view of a structural feature employed (as one example) for permanently anchoring the transparent bushing onto the front end of the connector body.

Figure 5:
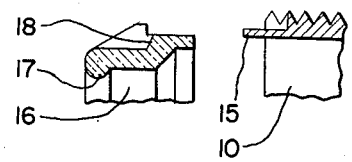

Fig. 5 is a view similar to Fig. 4, except showing the transparent bushing and tubular body separated, that is, prior to anchoring them together to make a composite two-part tubular body.

Figure 6:
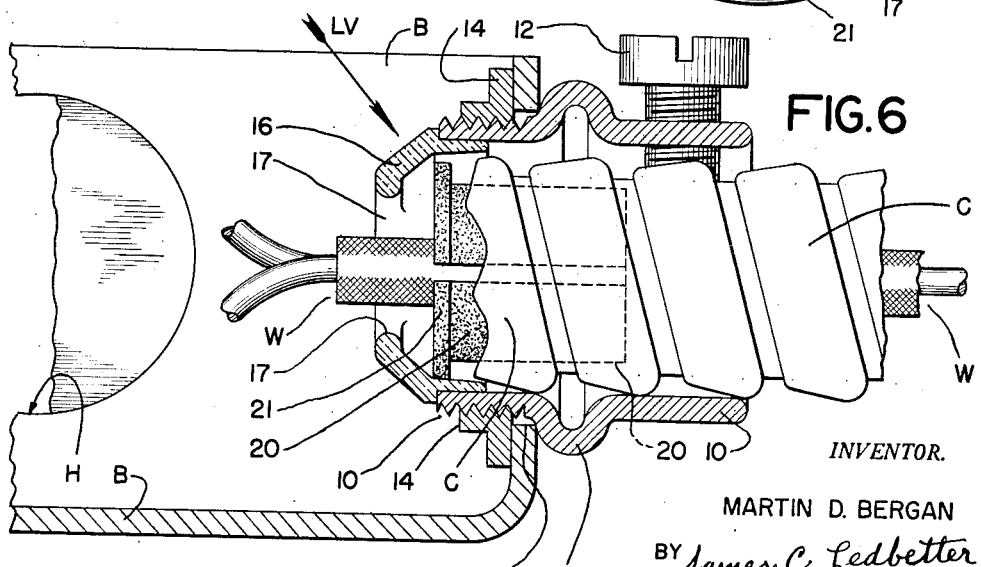

Fig. 6 shows a sectional view of the new cable connector fitted into the conventional knockout opening of a conduit box, thus assembling therein a spiral-armor raceway enclosing the electrical wiring, together with the anti-short insulation liner embracing the wires of the conductor.

The latter view is conventional of a box and spiral-armor (BX cable) juncture-assembly, except for the new transparent, full-view, novel bushing herein. The two assembly views (Figs. 3 and 6) demonstrate the utility of the invention by emphasizing important functional advantages of the novel bushing, among other things—first, its full-throated smooth-edge plastic formation increases protection against wear, tear and abrasion of the insulation on the live electrical wiring proximate the metal parts and—second, its transparent annulus of conical form provides for greater visibility and inspection convenience to make certain that the anti-short liner is in place to insure said live wiring.

Referring further to the drawings, a tubular body 10 of conventional form may be provided with an outer annular flange 11, as well as the usual form of cable-gripping set screw 12 at the rear end. A lock nut 14 (Fig. 6) is threaded onto the screw-threaded front end of the tubular body, as in known practice. These parts provide a setting or environment for the invention. However, it is apparent that other types of connector bodies may be utilized as a basis for the invention—next described.

Ears 15 are formed on the front end of the tubular body 10, below or inside the diameter of the screw-thread root, and extend forward parallel with the axis of the body, as well as being flush with the inner surface thereof. The ears 15 may be equally spaced around the circumference of the front end of the body. Four such ears are shown in this example of the invention as being satisfactory in practice.

A transparent plastic bushing 16 is shaped to form an annulus or nose at the front end of the tubular body 10. The bushing 16 has a cylindrical rear end which makes a close fit into the front end of the tubular body. However, the front extremity of such bushing comprises an annulus of frusto-conical form as shown, being the best shape for light refraction at or within the transparent annulus, thus enhancing visual inspection as well as facilitating the threading of the wiring therethrough.

A wire passage throat opening 17 is formed centrally through the transparent insulating bushing annulus 16. The throat is of oblong shape, as a means for providing (by its major diameter) a maximum-area opening through which insulated wires are threaded. At the same time, such oblong shape also provides (by its minor diameter) a limit-stop against which a minimum size spiral-armor may abut. This oblong form of throat is well adapted to a three-wire conductor.

The bushing 16 also is provided with a shoulder and groove formation 18, one for each ear 15—thus having four shoulder-grooves in registry with the four projecting ears of the tubular body. The grooves 18 (like the ears 15) are also below or inside the diameter of the screw threads on the tubular body 10. The rear circular or ring-like end of the plastic bushing 16 is fitted into the front end of the tubular body (note Figs. 4 and 5), with the ears 15 and shouldered-grooves 18 disposed in alignment, whereupon the ears are deformed or bent inwardly and hence into the grooves.

The rear ends of the grooves 18 terminate in radial shoulders (also 18, see Fig. 5), and the coacting ears 15 snuggle over the shoulders, four being shown thus reaching down into the grooves, and establishing a four-point permanent hold on the bushing for integrating it onto the front end of the tubular body 10. An external flange on the plastic bushing 16 stops it against the end circumference of the tubular body 10 when the ears are deformed inwardly to anchor these two parts together. This arrangement provides a composite tubular body, the major portion 10 of which is made of metal, while its front end nose portion 16 is made transparent and optically frusto-conical for visibility.

In describing the utility of the foregoing spiral-armor cable connector with its novel transparent plastic bushing 16, reference is made to Figs. 3 and 6 showing standard practice to which this new connector is well adapted. There is shown a conduit box B, with its knockout opening or hole H, in which the box and conduit juncture-assembly is made, being the critical part of an electrical raceway installation.

It is observed that the end of a spiral-armor cable C is mounted in the rear open end of the connector body 10, pushed into final position against the stop-bushing 16, with the electrical wiring W of the cable threaded and extending through the bushing-throat 17 at the front end, and into the box B, the cable armor being fastened in the connector by tightening the set screw 12 or other known means. Then the lock nut 14 is tightened against the inner wall of the box, thus gripping the annular flange 11 of the connector against the outside of the box wall, and assembling all parts in the knockout hole H.

The spiral-armor flexible conduiting C has its jagged rough-cut end fitted as usual by the workman on the job with an antishort liner (stippled for color red in Figs. 3 and 6), which is split lengthwise to facilitate its insertion. This liner comprises a fiber sleeve 20—forming its body which is crowded into the tubular end of the armor and around the wiring W insulation to reinforce it—together with an integral fiber flange 21 constituting its head which is either held close to or against the rough armor end to mask it and appearing in the form of a red circle or rim when viewed through the front-end window-like transparent bushing-stop annulus 16.

Of outstanding importance is the frusto-conical shape (interior and exterior) of the front extremity of this new bushing annulus 16. First, as to the interior shape, one readily appreciates that its funnel-like form acts to pilot and guide the ends of the wires W toward the center of the annulus. Thus the wires more readily pass from the tubular body 10, by finding the throat 17 and passing therethrough, and into the box B, as the workman fishes and threads them into position. Such function of the bushing is performed irrespective of the material of which it is made.

Second and of equal importance is the external shape of the bushing annulus 16. And in this respect, the annulus is of transparent material and also conically shaped to enhance the optical characteristics thereof. In explanation of these fundamentally new principles in the cable connector art, reference is made to a pointer, that is, to a line of vision arrow LV in Fig. 6. This arrow indicates the general angular direction in which a wiring inspector looks into the box B when peering for the red anti-short liner 21 which must be in place when the cable connector 10 is used with cable C of the spiral-armor type.

Observe that the line of vision arrow LV is at an angle to the general plane of the box B and hence at an angle to the axis of the anti-short liner red head or flange 21. Thus, by forming the transparent annulus 16 on a forward and inward taper (frusto-conical) toward the axis of the liner sleeve 20 and head 21, it follows that the line of vision LV is perpendicular to the external surface of said transparent conical bushing. This optical characteristic of the invention enhances the function of transparency of the annulus 16 because there is a more pronounced and uniform inward refraction of light, less shadow, and better visual inward penetration—when looking perpendicular to and through the annulus surface—than would be the case if the transparent annulus were of cylindrical form. For in the latter case, the general line of vision LV would not be perpendicular to the annulus surface, with the result that the red head 21 would not appear quite as clearly to the eye of the wiring inspector due to lack of collimation, i. e., correct line of sight.

While the patent drawings herein show the parts to a large scale, in actual practice the red head 21 is very small and difficult to see in its cramped position, especially so inside the box B when the latter is painted black. Thus for a fuller understanding of the optical feature, the reader should inspect my new connector as used in actual practice, where it is frequently necessary in dark places to use a flash light, with the result that the optical characteristic of this cable connector is of marked advantage.

From the foregoing, it is manifest that the generous area of the window-like transparent annulus or nose of my new bushing-stop 16 makes for clear visibility of the anti-short safety bushing liner 20—the flanged red head 21 thereof. A workman may not indifferently omit the red liner, since my new open-view connector immediately and more fully exposes his oversight, whereupon a wiring inspector will disapprove this part of the raceway electrical wiring installation.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

The invention is presented to fill a need for a new and useful cable connector. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

1. In a cable connector having a tubular metallic body, with its front end screw-threaded and thus adapted to be screw-fastened in a conduit box hole, and its rear end adapted to receive and grip a cable; the improvement which comprises a bushing made of insulation on the front end of the tubular metallic body, a limit-stop on the front end of the insulating bushing and against which the cable is adapted to abut, a throated passageway formed by the limit-stop and through which electrical wiring extends from the cable into the box; ears integrally formed in spaced relation around and on said front end of the tubular metallic body, said ears being formed below and hence inside the diameter of said screw threads, and said ears extending forwardly parallel with the axis of said body; together with grooves formed in spaced relation around the periphery of the insulating bushing, said grooves also being formed below and hence inside the diameter of the screw threads and in registry with the ears, and said ears being deformed into said grooves for permanently fastening the insulating bushing onto the front end of the tubular metallic body.

2. In a cable connector having a tubular metallic body, with its front end adapted to be secured in a conduit box hole, and its rear end adapted to receive and grip a spiral-armor cable, of which the cut-off armor extremity is fitted with a colored anti-short liner and from which the electrical wiring extends; the improvement which comprises a bushing made of transparent insulation fixed on the front end of the tubular metallic body, a limit-stop on the front end of the transparent bushing against which said colored liner is adapted to abut, a throated passageway formed by the limit-stop and through which said wiring extends into the box, and through the transparent insulating bushing the anti-short liner is visible; said transparent insulating bushing being generally frusto-conically shaped and thus tapered at its front end toward the wiring, to enchance its optical characteristic and increase the visibility of the colored anti-short liner, by reason of said conical shape presenting its surface substantially perpendicular to the general line of vision, which is at an angle to the plane of the box, when looking into said box toward the front end of the cable connector and through said transparent bushing to see the colored anti-short liner therein.

3. A cable connector as covered in claim 2, wherein said limit-stop and said throated passageway are both formed oblong in shape, and said oblong shapes thereof combine with said frusto-conical shape, to provide a viewing surface which is flat, and said flat-viewing surface being disposed substantially perpendicular to said general line of vision.

MARTIN D. BERGAN.

References Cited in the file of this patent

UNITED STATES PATENTS

| Number | Name | Date |
|---|---|---|
| 861,458 | Greenfield | July 30, 1907 |
| 1,225,125 | Guett | May 8, 1917 |
| 1,279,256 | Casper | Sept. 17, 1918 |
| 2,044,444 | Pond | June 16, 1936 |
| 2,466,930 | Cook | Apr. 12, 1949 |
| 2,478,082 | Broske | Aug. 2, 1949 |